United States Patent [19]

Shinohara

[11] 4,345,823
[45] Aug. 24, 1982

[54] REPRODUCTION LENS HAVING A SIX GROUP SIX ELEMENT COMPOSITION A LARGE VIGNETTING FACTOR AND A COMPACT SIZE

[75] Inventor: Hiroichi Shinohara, Yokohama, Japan

[73] Assignee: Kabushiki Kaisha Ricoh, Tokyo, Japan

[21] Appl. No.: 129,739

[22] Filed: Mar. 12, 1980

[30] Foreign Application Priority Data

May 30, 1979 [JP] Japan .................. 54-66147

[51] Int. Cl.³ .............................................. G02B 9/62
[52] U.S. Cl. .................................. 350/464; 350/450
[58] Field of Search ........................... 350/464, 450

[56] References Cited

U.S. PATENT DOCUMENTS

| | | | |
|---|---|---|---|
| 3,088,371 | 5/1963 | Lowenthal | 350/464 |
| 3,185,031 | 5/1965 | Betensky et al. | 350/464 |
| 3,871,749 | 3/1975 | Harada | 350/464 |
| 4,013,348 | 3/1977 | Yamada | 350/464 |

FOREIGN PATENT DOCUMENTS 51-10091  5/1976  Japan .
53-36776  8/1978  Japan .

*Primary Examiner*—F. L. Evans
*Assistant Examiner*—Rebecca D. Gass
*Attorney, Agent, or Firm*—Oblon, Fisher, Spivak, McClelland & Maier

[57] ABSTRACT

A reproduction lens assembly including two groups of three elements for providing a large aperture efficiency and a compact size formed by arranging a lens system symmetrically with respect to a stop wherein the each group of three elements further comprise a first convex Meniscus lens having a concave surface thereof directed toward the stop, the stop being positioned on the front side of the first Meniscus lens, a second concave Meniscus lens having a concave surface thereof directed toward the stop and a third convex Meniscus lens having a concave surface thereof directed toward the stop with a small air gap the third and second Meniscus lens.

1 Claim, 5 Drawing Figures

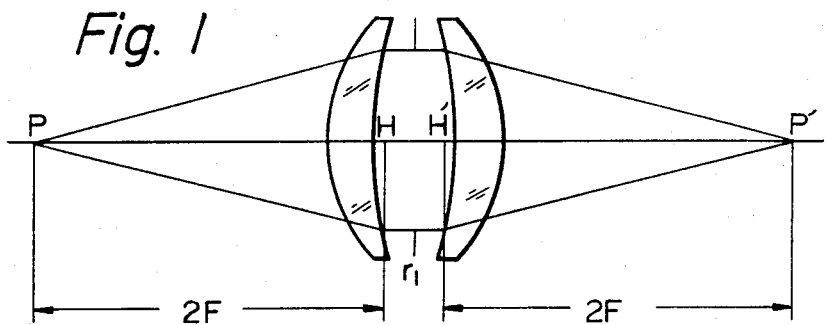
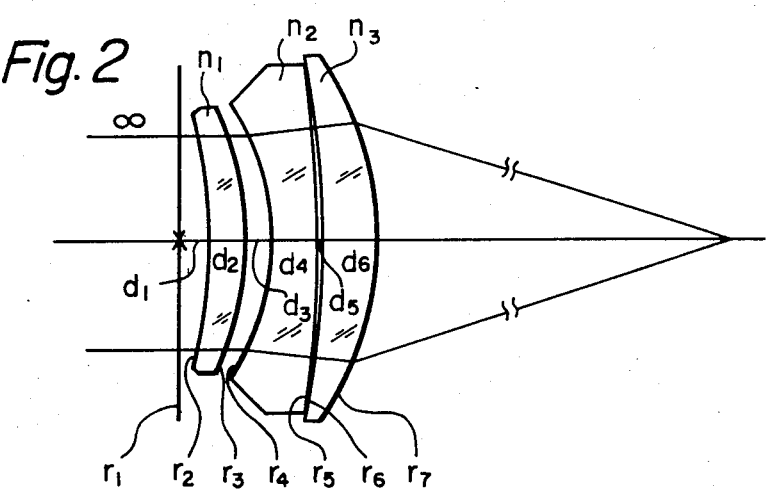
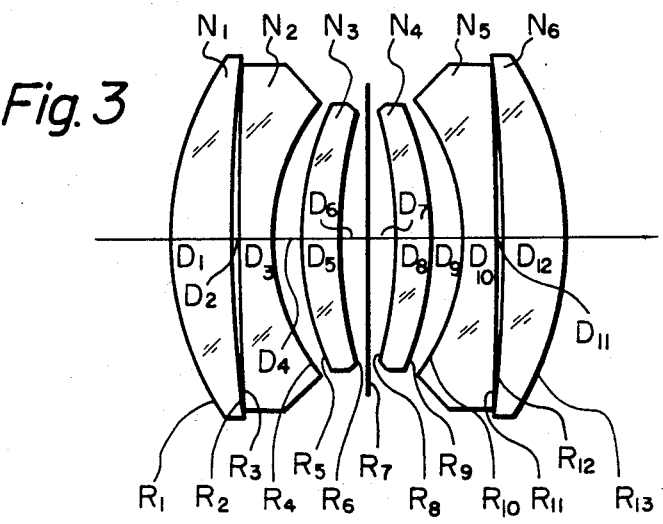

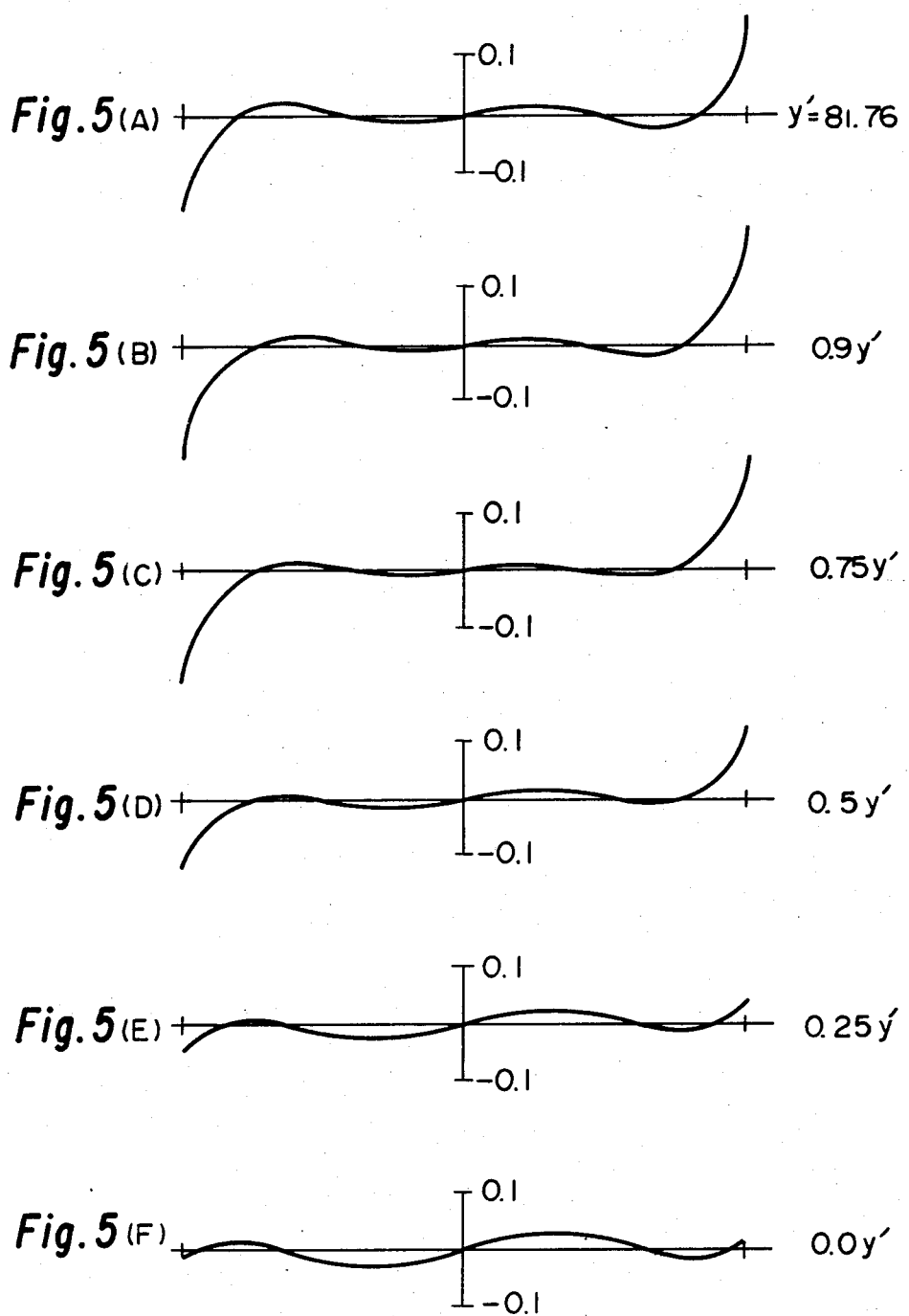

REPRODUCTION LENS HAVING A SIX GROUP SIX ELEMENT COMPOSITION A LARGE VIGNETTING FACTOR AND A COMPACT SIZE

BACKGROUND OF THE INVENTION

The invention relates in general to a reproduction lens, and, in particular, to a reproduction lens having a six group six element composition, a large vignetting factor and a compact size.

DESCRIPTION OF THE PRIOR ART

Hitherto, as a lens of this type, an "equal magnification lens" disclosed in Japanese Patent Publication No. 10091/1976 and an "object lens for reproduction" disclosed in Japanese Patent Publication No. 36776/1978 have been known. However, the total length of the above mentioned equal magnification lens is 0.393 F in the case of Example 1 and 0.437 F in the case of Example 2. On the contrary, the total length is 0.336 F in the case of the present invention. Further, in the latter object lens for reproduction shown in Japanese Patent Publication No. 36776/1978, the lens includes five groups of seven elements or seven groups of seven elements and, thus the total number of lens elements is relatively large. Furthermore, the total length of the lens is 0.4146 F in the case of Example 1 and 0.4192 F in the case of Example 2. Accordingly, the total length of the lens is relatively large.

SUMMARY OF THE INVENTION

An object of the present invention is to overcome the above-mentioned drawbacks evident in the conventional lens of this kind.

A further object of the present invention includes providing a reproduction lens having a six groups six elements compositions, a compact size and excellent quality operational characteristic.

In other words, the object of the present invention is to provide a reproduction lens which has a vignetting factor of about 100% in spite of using up to a half angle of view of 22° at a magnification near equal magnification of aperture ratio 1:4.5, the total length of the lens, that is the distance from the first surface of the lens to the last surface of the same being about 0.34 F (wherein F denotes a focal length of a symmetrical lens) and has an excellent quality up to the outermost marginal part thereof.

In a reproduction machine or the like, rapid development of an original is required for reproducing many copies during a short time period. For this purpose, the lens system used in the machine must be bright and be able to provide adequate light even in the marginal part thereof. However, for providing adequate light even in the marginal part thereof, the lens must have a large effective diameter. The weight of the lens then becomes large and causes problems in moving the lens. Accordingly, the provision for a large vignetting factor and compactness while keeping a same focal length become contradictory requirements.

The present invention satisfies these demands and the lens includes six groups of six elements a former and a latter contact lens of ortho-meta-type are separated by a small gap and the lens is quite symmetrical with respect to a stop.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 1 is a schematic view explaining the concept of the position of equal magnification.

FIG. 2 is a composition view of the quite symmetrical lens of the present invention which was divided with respect to a stop.

FIG. 3 is a schematic view explaining the composition of an embodiment of the present invention.

FIGS. 5(A) to (F) denotes the transverse aberration curves of the above mentioned embodiment and in denote changes at each image height position.

DETAILED DESCRIPTION OF THE PREFERRED EMBODIMENTS

Figure 4:
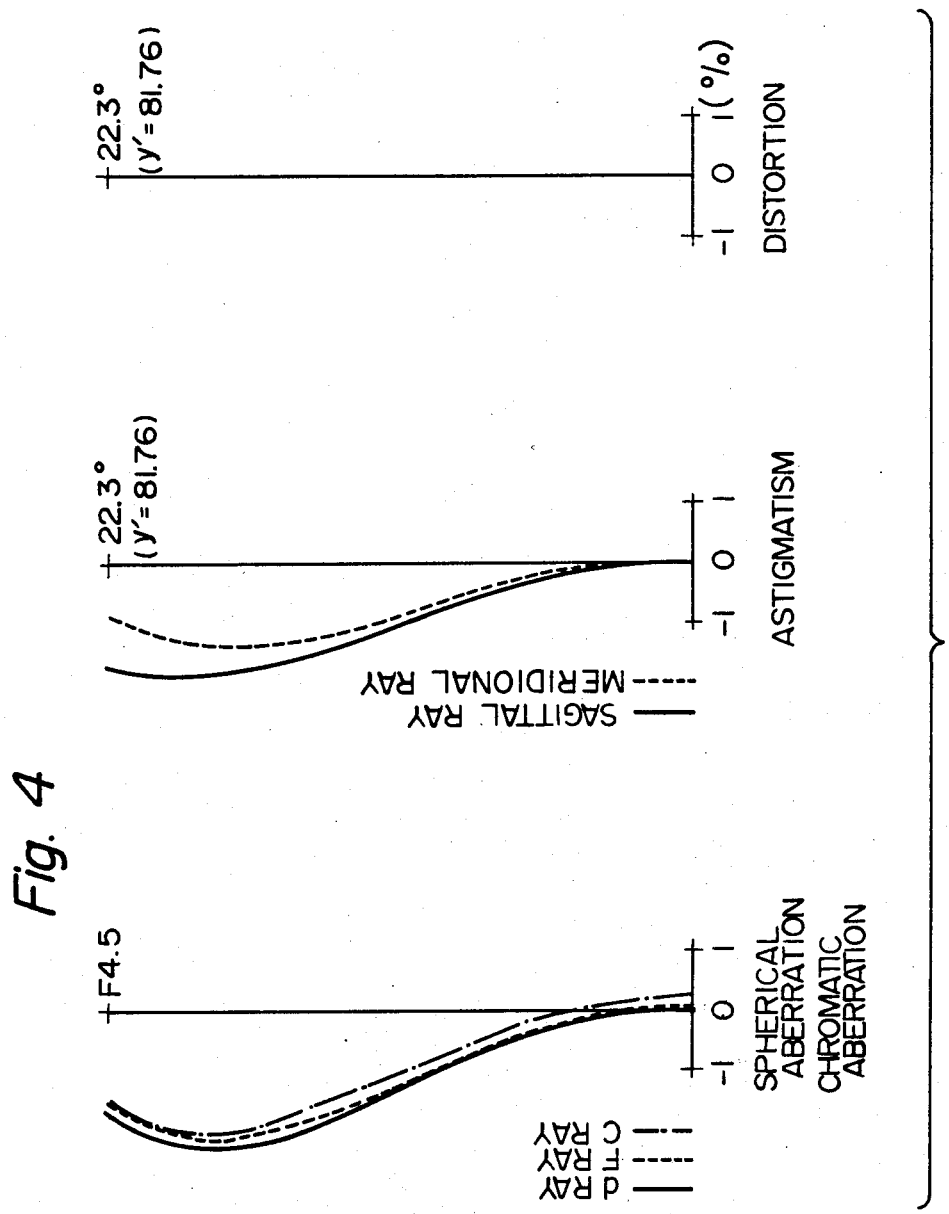
FIG. 4 denotes the aberration curves of the embodiment of the present invention shown in the FIG. 3.

In a quite symmetrical lens as seen in FIG. 1, the lens is divided into two parts with respect to a stop for making correction of various aberrations during equal magnification and the object point at infinity may be thought to focus at the position of equal magnification as is apparent from the drawing of FIG. 2. In the same figure, P denotes an object point, P' an image point, H the first principal point, H' the second principal point, F a focal length of a quite symmetrical lens and $r_1$ a surface of a stop.

In accordance with the present invention, a reproduction lens assembly having two groups of three elements having a large vignetting factor and a compact size formed by arranging a lens system satisfying the following conditions quite symmetrically with respect to a stop is obtained, including a first convex Meniscus lens arranged its concave surface toward a stop, the stop being arranged on the front side of the lens, a second concave Meniscus lens arranged such that its concave surface is directed toward the stop and a third convex Meniscus lens arranged such that its concave surface is directed toward the stop with a small air gap against the second lens, wherein $r_1$ denotes a surface of a stop, $r_2$, $r_3$ ... $r_7$ denote a radius of curvature of each lens respectively, $d_1$ denotes the distance between the stop and the first lens, $d_2$, $d_3$ ... $d_6$ denote the distance between each lens surface respectively, $n_1$, $n_2$, $n_3$ denote a refractive index of each lens respectively, $f_1$, $f_2$ ... $f_7$ denote a focal length up to each surface respectively and f denotes a composite focal length, with the relation:

$$0.00981 f < d_1 < 0.01962 f \quad (1)$$

$$1.32 < \frac{f}{f_3} < 1.40 \quad (2)$$

$$-3.1 < \frac{f}{f_5} < -2.7 \quad (3)$$

$$0.01717 f > d_3 \quad (4)$$

$$-0.1325 f < r_4 < -0.1227 f \quad (5)$$

$$0 < n_3 - n_2 < 0.07 \quad (6)$$

-continued
$$0.108 f > d_1 + d_2 + d_3 + d_4 + d_5 + d_6. \quad (7)$$

Next, each of the above mentioned conditions is explained. Firstly, condition (1) defines the range in which the position of a stop is set. Even though this value is preferably large for eliminating flares of coma aberration seen at the places wherein an incident height of oblique ray is high or low, the lens can not be made compact at a value beyond the upper limit and the flare of coma aberration becomes remarkably large and reaches a value beyond the lower limit. After the position of a stop has been settled, the distribution of powers of the lens system is effected. That is, if the power up to the first lens is within the range of the condition (2) and the power up to the second lens is within the range of the condition (3), then a preferred curvature of a field can be obtained up to a half angle of view of about 22°.

When the distribution of total powers is made, condition (2) should be first determined. If the value of $f/f_3$ becomes larger than the upper limit, then the image surface becomes rapidly positive and a wide angle of view can't be maintained. If the value becomes smaller than the lower limit, then the image surface becomes negative and the balance at the center becomes undesirable. Accordingly, the value should be within the range of condition (2).

Condition (3) is determined in connection with condition (2). If the value of $f/f_5$ becomes larger than the upper limit, then a spherical aberration becomes positive and an astigmatism becomes negative. On the other hand, if the value becomes smaller than the lower limit, then a spherical aberration becomes negative and an astigmatism becomes positive. Thus, the shifts of aberration in the center and the marginal part are opposite in direction. Therefore, it is desirous that the value be in the range of condition (3). After the distribution of these powers has been settled, the composite focal length f is to be determined.

Next, condition (4) is one for making an image angle wide while the above mentioned distribution of the powers is maintained. If this condition is not satisfied, then the places wherein an image angle in the sagittal direction of astigmatism is large drops in the positive direction and the capacity rapidly deteriorates.

Next, condition (5) is one for eliminating the flares of coma aberration along with the condition (1). If the value of $r_4$ becomes larger than the upper limit, both a spherical aberration and an astigmatism shift to the positive direction and especially, the flares of coma aberration at the places of wide angle viewing becomes large. It thus becomes impossible to obtain a vignetting factor of about 100%. On the other hand, if the value becomes smaller than the lower limit, the astigmatism in the intermediate portion becomes large and therefore a flat image surface can't be obtained.

Generally speaking, a reproduction lens has a long focal length and a chromatic aberration on an axis becomes large. Condition (6) is one for compensating the above mentioned effect by making the difference of refractive indexes of the third and the second lenses small. For that purpose, it is necessary to keep such difference less than 0.07. If the difference becomes zero, the effect or object will not be obtainable.

Lastly, the condition (7) is one for defining the range in which a lens system becomes compact. Further a front and back lenses in a conventional ortho-meta type are contacted with each other. However, they are separated with each other, while keeping a small gap between them in the present invention and this fact is desirable for rendering the whole lens compact while simultaneously eliminating the flares of coma aberration which make the image worse.

If the lens is arranged quite symmetrically with respect to a stop, then the total length of the lens system become 0.34 times the focal length of a quite symmetrical lens while maintaining a vignetting factor of about 100%. Further, the capacity may be desirably maintained up to the outermost marginal part.

An embodiment satisfying the above mentioned conditions will now be described. Assuming that:

| | |
|---|---|
| $R_1, R_2 R_{13}$ : | radius curvature of each lens |
| $D_1, D_2 D_{12}$ : | gap between each lens surface |
| $N_1, N_2 N_6$ : | refractive index of glass (d ray) |
| $\nu_1, \nu_2 \nu_6$ : | Abbe number of glass |
| F : | focal length of quite symmetrical lens |
| M : | magnification of lens |
| $\omega$ : | half angle of view |

Aperture ratio = 1 4.5, F = 100mm, M = 1.0 & $\omega$ = 22.4°

| | | | | | | | |
|---|---|---|---|---|---|---|---|
| $R_1$ | 26.997 | $D_1$ | 5.519 | $N_1$ | 1.72000 | $\nu 1$ | 43.7 |
| $R_2$ | 119.987 | $D_2$ | 0.064 | | | | |
| $R_3$ | 129.506 | $D_3$ | 3.560 | $N_2$ | 1.64769 | $\nu 2$ | 33.8 |
| $R_4$ | 20.733 | $D_4$ | 2.400 | | | | |
| $R_5$ | 31.998 | $D_5$ | 2.880 | $N_3$ | 1.69350 | $\nu 3$ | 50.8 |
| $R_6$ | 50.194 | $D_6$ | 2.400 | | | | |
| $R_7$ | ∞ (stop) | $D_7$ | 2.400 | | | | |
| $R_8$ | −50.194 | $D_8$ | 2.880 | $N_4$ | 1.69350 | $\nu 4$ | 50.8 |
| $R_9$ | −31.998 | $D_9$ | 2.400 | | | | |
| $R_{10}$ | −20.733 | $D_{10}$ | 3.560 | $N_5$ | 1.64769 | $\nu 5$ | 33.8 |
| $R_{11}$ | −129.506 | $D_{11}$ | 0.064 | | | | |
| $R_{12}$ | −119.987 | $D_{12}$ | 5.519 | $N_6$ | 1.72000 | $\nu 6$ | 43.7 |
| $R_{13}$ | −26.997 | | | | | | |

Next, the fine Seidel aberrations of the above mentioned embodiment at the time when F is assumed to be 1 is as follows. However, it is assumed herein that P denotes a term of Petzval, S that of spherical aberration, C that of coma aberration, A that of astigmatism, and Dis. that of distortion aberration respectively.

| | P | S | C | A | Dis. |
|---|---|---|---|---|---|
| 1. | 1.551 | 12.369 | 3.339 | 0.901 | 0.662 |
| 2. | −0.349 | 2.046 | −1.578 | 1.217 | −0.670 |
| 3. | 0.304 | −2.133 | 1.577 | −1.165 | 0.637 |
| 4. | −1.896 | −16.213 | −5.489 | −1.858 | −1.271 |
| 5. | 1.280 | 4.806 | 2.464 | 1.263 | 1.304 |
| 6. | −0.816 | 0.000 | 0.000 | −0.001 | −1.043 |
| 7. | 0.000 | 0.000 | 0.000 | 0.000 | 0.000 |
| 8. | −0.816 | −3.065 | 1.145 | −0.428 | 0.465 |
| 9. | 1.280 | 16.629 | −1.795 | 0.194 | −0.159 |
| 10. | −1.896 | −33.156 | −0.014 | 0.000 | −0.001 |
| 11. | 0.304 | −0.006 | −0.052 | −0.451 | −1.269 |
| 12. | −0.349 | 0.003 | 0.035 | 0.451 | 1.307 |
| 13. | 1.551 | 20.498 | 1.075 | 0.056 | 0.084 |
| Σ | 0.148 | 1.778 | 0.707 | 0.179 | 0.046 |

In accordance with the aberration curve in the case of equal magnification shown in FIG. 4, it is clear that the chromatic aberration of a spherical surface is well corrected and the sagittal ray of astigmatism never becomes excessive in the vicinity of an angle of view of 22° and the image surface becomes flat. Further, as is apparent from the transverse of distortion aberration curve, the vignetting factor is nearly 100% up to the outermost marginal part but the flare of coma aberration is small nevertheless. In FIG. 4 y' denotes an image height and the full line denotes d ray.

While what has been described and illustrated herein is a preferred embodiment of the present invention, it will be apparent to those skilled in the art that changes and modifications may be made thereto without departing from the spirit and intension of our invention which is to be limited only to the scope of the appended claim.

What is claimed as new and desired to be secured by Letters Patent of the United States is:

1. A reproduction lens assembly comprising: two groups of three elements for providing a large aperture efficiency and a compact size formed by arranging a lens system symmetrically with respect to a stop, wherein said two groups of three elements include a first pair of convex Meniscus lenses having a concave surface thereof directed toward said stop, said stop being positioned between the lenses of the first pair of Meniscus lenses, a second pair of concave Meniscus lenses having a concave surface thereof directed toward the stop and a third pair of convex meniscus lenses having a concave surface thereof directed toward the stop with a small air gap being formed between the third pair and second pair of Meniscus lenses, wherein $r_1$ denotes a surface of a stop, $r_2, r_3 \ldots r_7$ denote a radius of curvature of each of said lenses, respectively, $d_1$ denotes the distance between the stop and each of said lenses of the first pair of lenses, $d_2, d_3 \ldots d_6$ denote the distance between each surface of said lenses, respectively, $n_1, n_2, n_3$ denote a refractive index of each of said lenses, respectively, $f_1, f_2 \ldots f_7$ denote a focal length up to each surface, respectively, and f denotes a composite focal length, and wherein the following conditions are met:

$$0.00981 f < d_1 < 0.01962 f \tag{1}$$

$$1.32 < \frac{f}{f_3} < 1.40 \tag{2}$$

$$-3.1 < \frac{f}{f_5} < -2.7 \tag{3}$$

$$0.01717 f > d_3 \tag{4}$$

$$-0.1325 f < r_4 < -0.1227 f \tag{5}$$

$$0 < n_3 - n_2 < 0.07 \tag{6}$$

$$0.108 f > d_1 + d_2 + d_3 + d_4 + d_5 + d_6. \tag{7}$$

* * * * *